(12) United States Patent
Kok et al.

(10) Patent No.: US 6,489,995 B1
(45) Date of Patent: Dec. 3, 2002

(54) METHOD AND APPARATUS FOR MOTION VECTOR CONCEALMENT

(75) Inventors: Chi Wah Kok, Fremont, CA (US); Ning Lu, Mountain View, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/177,676

(22) Filed: Oct. 22, 1998

(51) Int. Cl.[7] .................................................. H04N 7/18
(52) U.S. Cl. ................................... 348/416; 375/240.16
(58) Field of Search ....................... 375/240.12–240.27; 382/236

(56) References Cited

U.S. PATENT DOCUMENTS

| | | | | |
|---|---|---|---|---|
| 5,400,076 A | * | 3/1995 | Iwamura ................. | 375/240.16 |
| 5,621,467 A | * | 4/1997 | Chien et al. ................. | 348/409 |
| 5,724,369 A | * | 3/1998 | Brailean et al. ............... | 371/31 |
| 5,742,289 A | * | 4/1998 | Naylor et al. .......... | 375/240.16 |
| 5,987,180 A | * | 11/1999 | Reitmeier .................... | 382/236 |
| 6,067,322 A | * | 5/2000 | Wang ......................... | 375/240 |
| 6,178,265 B1 | * | 1/2001 | Haghighi .................... | 382/236 |
| 6,240,211 B1 | * | 5/2001 | Mancuso et al. ........... | 382/236 |
| 6,285,715 B1 | * | 9/2001 | Ozcelik et al. ........ | 375/240.27 |

* cited by examiner

*Primary Examiner*—Andy Rao
(74) *Attorney, Agent, or Firm*—Blakely, Sokoloff, Taylor & Zafman LLP

(57) ABSTRACT

An innovative method and apparatus for decoding an encoded image such as a video. In one embodiment a method for decoding an encoded block of an image, e.g.,a video frame, having an error in its motion vector is disclosed. Sub-blocks are extracted from neighboring blocks to the encoded block. A motion vector is generated for each sub-portion and the generated motion vectors are used, for example, averaged, to estimate a motion vector for the encoded portion.

25 Claims, 5 Drawing Sheets regions with motion vectors that cannot be decoded due to noise corruption regions with motion vectors that cannot
be decoded due to noise corruption

METHOD AND APPARATUS FOR MOTION VECTOR CONCEALMENT

BACKGROUND OF THE INVENTION

1. Field of the Invention

The present invention relates to recovery of motion vectors from damaged encoded data.

2. Art Background

In predictive video coding techniques, such as MPEG (Motion Picture Experts Group) or ITU/T H.26 x code, each video frame is divided into macro-blocks of regular size. To achieve compression, the macro-blocks are predicted from the previous frames, and motion information in the form of motion vectors and the prediction residual are transmitted to the decoder in place of transmitting the pixel values directly. To achieve a high compression ratio, a variable-length coding scheme, such as Huffman coding, is applied to the motion vector to increase the compression efficiency of the video system. However, when a transmission error occur, it often causes lost of synchronization, and hence results in error propagation. As a result, all codewords after the noise corrupted codeword and before the next synchronization word are also corrupted which results in non-reliable communications. Even a single bit-error may cause the decoder to continually produce erroneously decoded data due to the property of variable-length codes. This effectively increases the Bit Error Rate (BER) and lowers the Quality of Service (QOS) of a system where the signals are easily corrupted by burst transmission errors.

The number of motion vectors lost due to noise corruption can be reduced by increasing the frequency of the synchronization words in the data stream or by the application of reversible variable length codes. However, noise corruption will still cause errors in macro-blocks and hence the motion vectors may not be available in the decoder.

Motion vector concealment or temporal error concealment refers to a process to recover the motion vectors lost due to noise corruption during transmission. Most techniques in literature are concentrated in two categories: unshifted replacement and shifted replacement. In unshifted replacement, a lost macro-block is replaced by the macro-block in the preceding picture at exactly the same location. A drawback of unshifted replacement is that it leads to annoying motion blocking artifacts in active regions in a moving picture. In shifted replacements, a new motion vector is generated from neighboring macro-block's motion vectors by techniques, such as averaging, median etc., to recover or conceal the noise corrupted macro-block. There are several drawbacks to shifted replacement. The neighboring macro-blocks may not have motion vector information, e.g., neighboring macro-blocks can be intra-coded, or the neighboring blocks are also noise corrupted. In addition, the motion field generated by the neighboring block's motion vector may not be smooth. A smooth motion field is required to minimize both motion blocking and static blocking artifacts in the decoded images. Hence, the simple motion vector regeneration algorithms used in shifted replacement will not be able to generate a human perception pleasing motion vector to conceal the noise corrupted macro-blocks.

SUMMARY OF THE INVENTION

A method and apparatus of the present invention decodes an encoded portion of an image having an error in one of its parameters, such as a motion vector, by estimating the parameter using neighboring block information. In particular in one embodiment, sub-portions from neighboring decoded portions of an image are extracted. A motion vector is then generated for each sub-portion. In one embodiment, the motion field generated by the motion vectors of each sub-portion is made smooth by using sub-portions that have overlapping regions. Using the motion vectors generated for each sub-portion, a motion vector is estimated for the encoded portion. This estimated motion vector is then used to decode the encoded portion of an image such as the video frame.

BRIEF DESCRIPTION OF THE DRAWINGS

The objects features and advantages of the present invention will be apparent from the following detailed description in which.

DETAILED DESCRIPTION

In the following description, for purposes of explanation, numerous details are set forth in order to provide a better understanding of the present invention. However, it will be apparent to one skilled in the art that these specific details are not required to practice the present invention. In other instances electrical structures and circuits are shown in block diagram form in order to not obscure the present invention unnecessarily.

The present invention provides a method and apparatus for error concealment or recovery of an encoding parameter in an encoded image. The invention will be discussed with respect to motion vector concealment; however the teachings of the present invention can be applied to other loss or corrupted encoding parameters. The embodiments discussed here utilize data encoded according to the MPEG (Motion Picture Experts Group); however, other encoding techniques can used.

In one embodiment of the present invention, motion vector information is recovered to decode a portion of an image, in the present embodiment a video frame, using neighboring information. In the following description a portion of the image is referred to as a block. Typically a block consists of an 8×8 array of bits; although other block sizes can be used. A portion may also be described as a macro-block which is formed of the plurality of blocks, typically six.

Figure 1A:
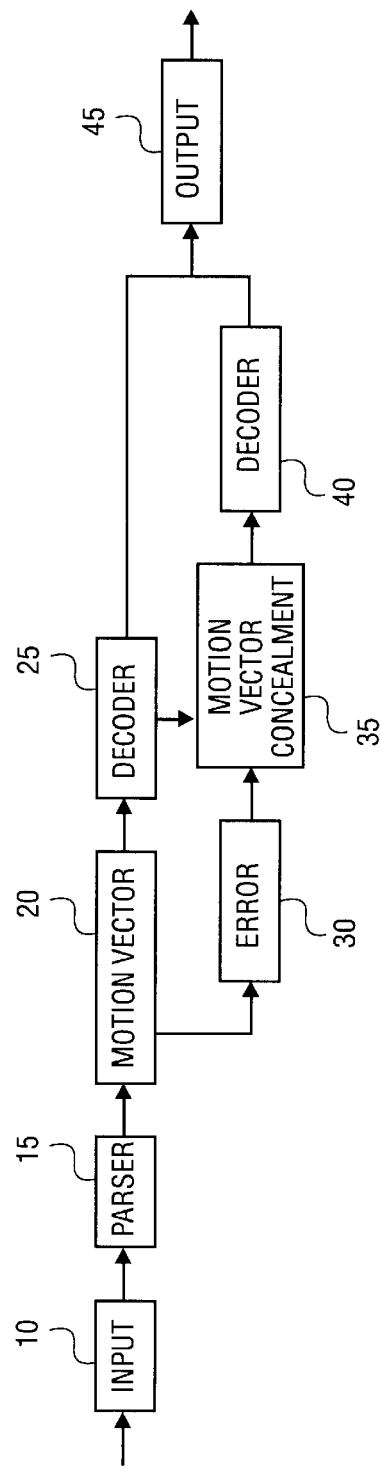
FIG. 1a and FIG. 1b represent embodiments of an apparatus of the present invention.

One embodiment of an apparatus that operates in accordance with the teachings of the present invention is shown in FIG. 1a. A bitstream of encoded data is received at the input 10 to a parser 15 or similar circuitry which extracts block parameter information, such as a motion vector, and encoded image data from the bitstream. Motion vector circuitry 20 retrieves the motion vector and the corresponding image data of the block which is decoded by decoder 25. If an error is detected when extracting the motion vector from the bitstream, the motion vector concealment process described below is performed. More particularly, error logic 30 flags the error and motion vector concealment logic 35 estimates the motion vector as described below. Decoder 40 decodes the data using the estimated or concealed motion vector for output through output 45.

Figure 1B:
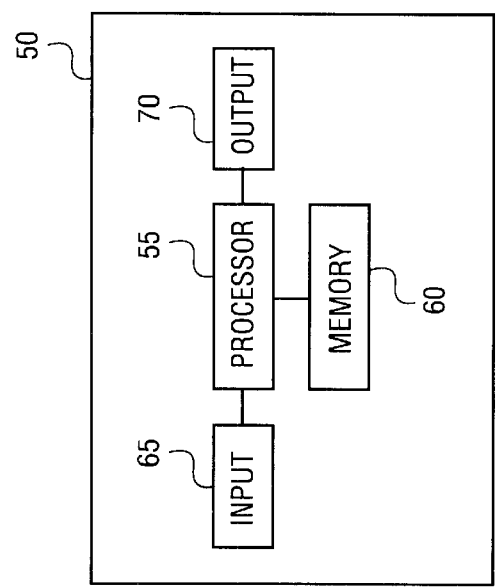

An alternate embodiment is illustrated in FIG. 1b. In this embodiment, the processes described below are performed by a processor system 50. Processor 55 executes instructions stored in memory 60 to perform the processes described herein. The bitstream is received by the input 65 and the decoded data is output by output 70.

Figure 2:
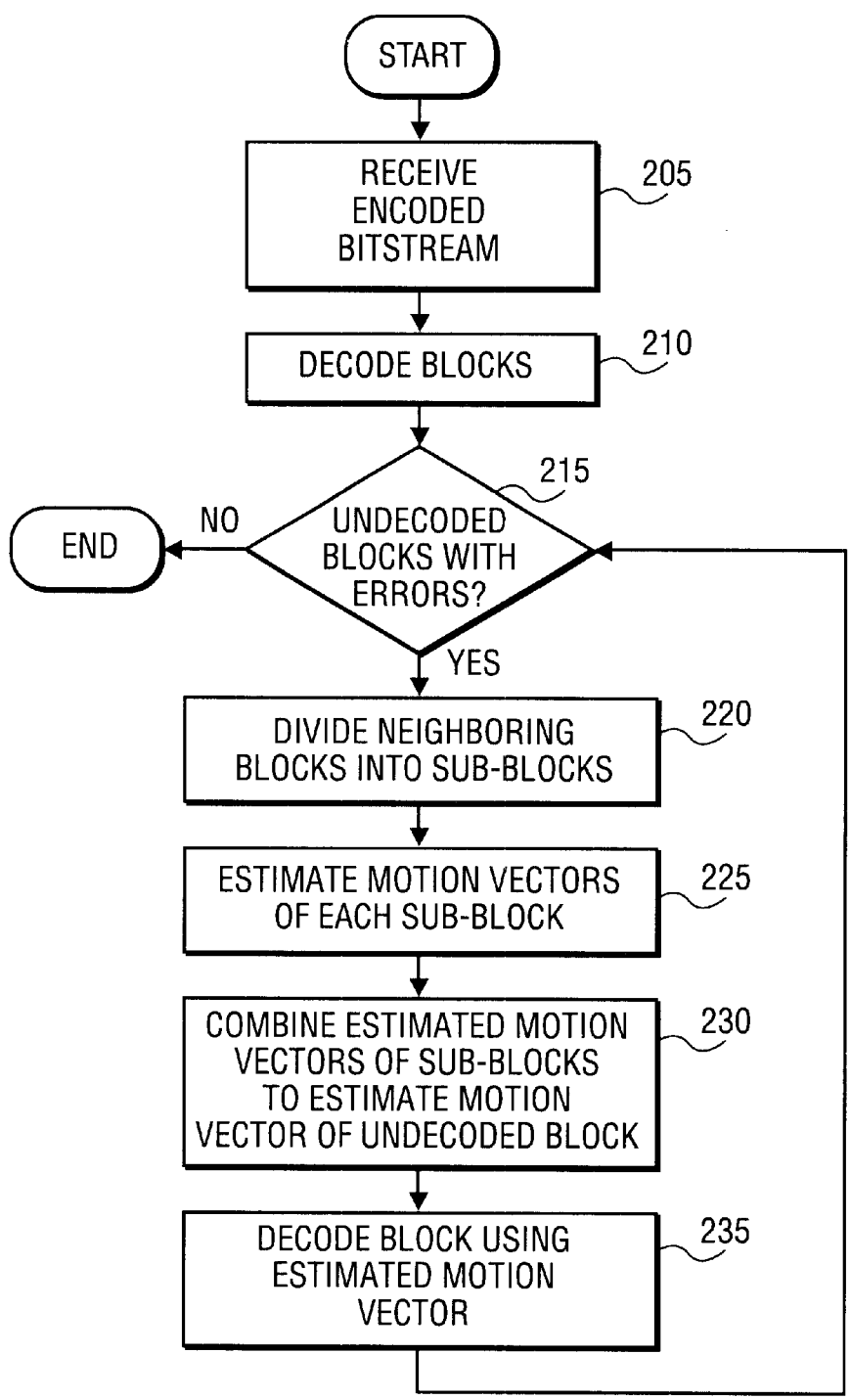
FIG. 2 is a simplified flow diagram illustrating one embodiment of the method of the present invention.

One embodiment of the process of the present invention is illustrated by FIG. 2. In the present embodiment, an encoded block having a lost/damaged motion vector is decoded by estimating a motion vector, using the information gathered from the portions of the neighboring blocks. Preferably the boundary portion of the neighboring regions should overlap so as to generate a smooth motion field for motion vector concealment. The smooth field is important for reducing motion blocking effects. Since the region inside the block of concern is not available, the neighboring regions used to estimate the motion vector typically are not square in shape. The following illustrates how to form neighboring regions with maximum overlap usable for the concealment process.

Figure 3:
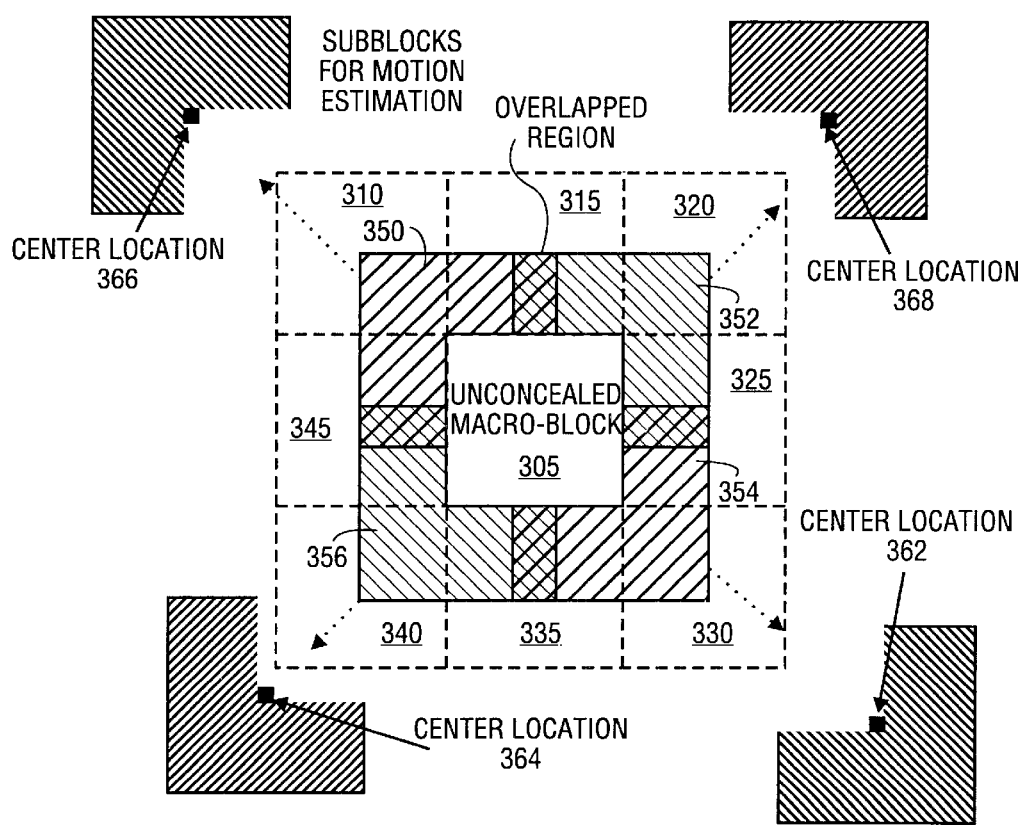
FIG. 3 illustrates blocks, portions of blocks and sub-portions of blocks in accordance with the teachings of the present invention.

At step 205 an encoded bitstream is received. The encoded bitstream typically includes data and corresponding encoding parameters such as the motion vector which describes the motion that occurs between sucessive video frames. If, at step 210, the bitstream includes blocks that can be decoded, they are decoded. At step 215 it is determined whether any blocks remain undecoded due to errors in the encoding parameter, e.g., motion vector. Errors can arise due to damage or lost portions of the bitstream that contain the motion vectors. For each undecoded block, steps 220, 225, 230, 235 are applied. At step 220, decoded blocks that are neighbors to the undecoded block are examined and sub-blocks or sub-portions are extracted from the decoded neighboring blocks. Preferably, the boundary regions of the sub-blocks or sub-portions should be overlapping to smooth the motion field associated with the motion vectors of each sub-blocks. The larger the overlap, the smoother the motion field and the further the reduction of blocking artifacts. However, the larger the overlap, the more inaccurate the estimated motion vector for each sub-block. Thus, a large overlap will eventually result in an inaccurate motion vector estimation for concealment purposes, resulting in blocking effects in the concealed video frame. In one embodiment, a maximum overlap of less than 30% is used for accurate motion vector concealment. To achieve maximum overlap, the sub-blocks should overlap both adjacent blocks and the noise corrupted block. Since the data of the noise corrupted block is not available, the shape of the sub-block will have to be modified accordingly to achieve maximum overlap. FIG. 3 is one example of the modified sub-blocks.

Referring to FIG. 3, the encoded or unconcealed block 305 is surrounded by neighboring blocks 310, 315, 320, 325, 330, 335, 340 and 345. Sub-blocks are extracted from the neighboring blocks 310, 315, 320, 325, 330, 335, 340 and 345. In the present embodiment sub-blocks 350, 352, 354 and 356 are extracted. It should be noted that each sub-block 350, 352, 354 and 356 border two sides of the encoded block 305. In addition, it should be noted that each sub-block overlaps the adjacent sub-block as shown in the figure.

Referring back to FIG. 2, at step 225 the motion vector of each sub-block is generated. The motion vectors are preferably generated referring to corresponding data of the previous frame and the motion vector is measured relative to center points of the sub-blocks such as center points 362, 364, 366, 368 shown in FIG. 3. At step 230 the motion vector for the undecoded block is estimated from the motion vectors of the sub-blocks. There are a variety of ways to utilize the sub-block motion vector for the noise corrupted block. In one embodiment, the estimated motion vector is generated as the average, median, as some other function of the sub-block motion vectors. Alternately, each sub-block motion vector may be weighted by motion estimation errors associated with each of the sub-blocks which are obtained together with the motion vectors of the sub-blocks by some motion estimation algorithms. There are a variety of known motion estimation algorithms and motion error criteria that can be applied. In the present embodiment, a full search motion estimation is applied to each sub-block and the mean square error is used to measure the motion estimation error. For further information see, for example, G. Tziritas, C. Labit, *Motion Analysis for Image Sequence Coding* (1994).

By weighing the motion vectors of each sub-blocks using the associated motion estimation error, the motion vectors are essentially normalized by the prediction error. As a result, a more accurate motion vector can be generated for concealment. Such normalization procedure is particularly useful when the block to be concealed is located at the motion boundary.

At step 235, once the motion vector is estimated, the estimated motion vector is used to recover or conceal the noise corrupted block.

Figure 4:
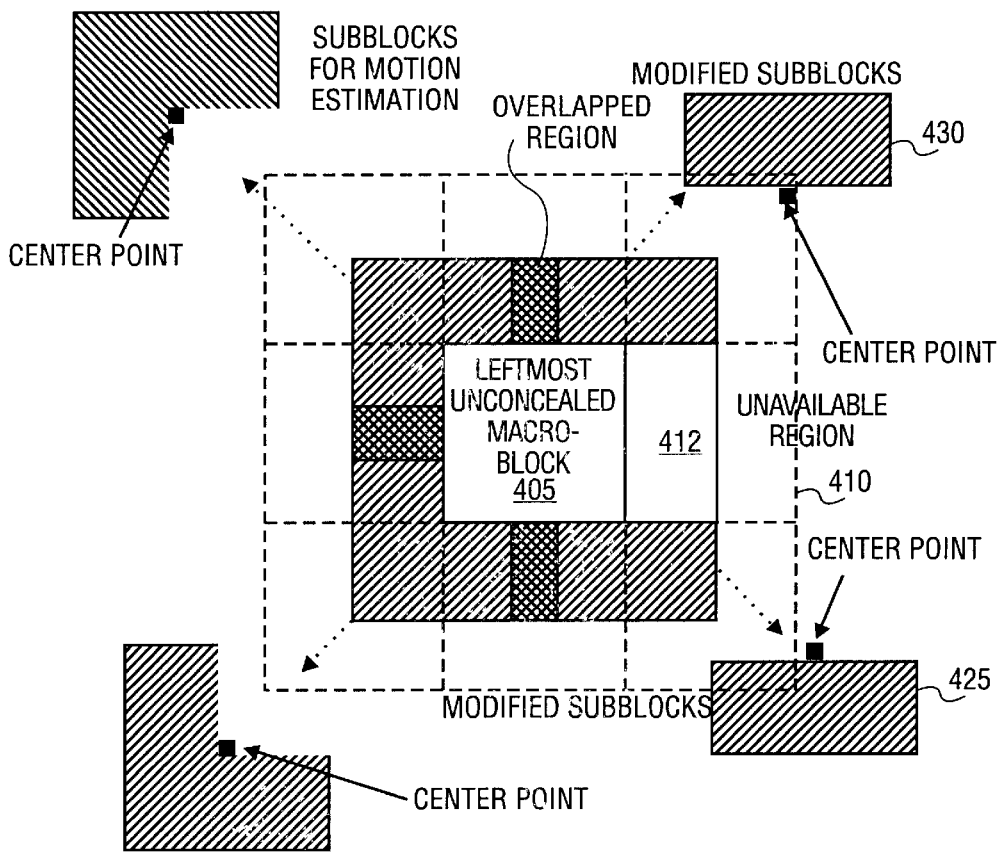
FIG. 4 illustrates an alternate embodiment of sub-portions of blocks in accordance with the teachings of the present invention.

FIG. 4 illustrates an alternate embodiment for determining the sub-blocks to be used to estimate the motion vector of an encoded block. In this situation the neighboring block 410 is unavailable, perhaps due to an error in the corresponding data. Thus, region 412 is unavailable. In this embodiment, modified sub-blocks 425 and 430 are generated and used in the process to estimate the motion vector. In an alternate embodiment, a single block that is big enough to enclose the entire noise corrupted block can be used. The block size has to be big enough in order to provide adequate information to facilitate a good estimate in the motion estimation process. The advantage to this embodiment is the reduction in motion blocking artifacts. However, the bigger the block size, the more chance for the inclusion of motion boundary inside the block. This results in inaccurate motion estimation, and hence limits the performance of the concealment process. Therefore, a balance of size and the probability of incurring a motion boundary should be achieved to meet performance requirements.

Figure 5:
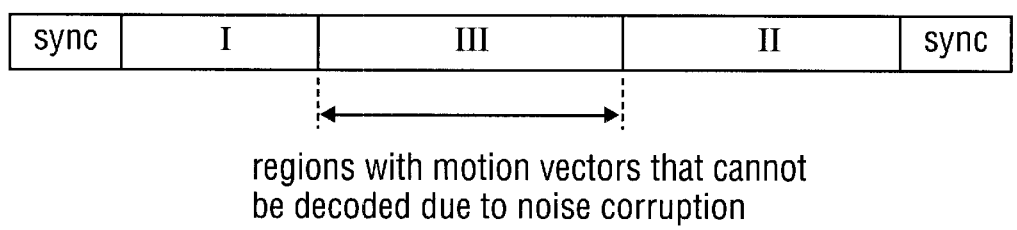
FIG. 5 illustrates a data stream having loss/corrupted data that is the teachings of the present invention.

The processes described herein can be applied to multiple regions with corrupted or lost data. This will be discussed with respect to FIG. 5. FIG. 5 is illustrative of the data stream to be decoded. Region 1 and region 2 are regions that can be decoded. For example, a reversible variable length coding process enables region 1 to be decoded using a forward decoding process and region 2 to be decoded using a reverse process. Region 3 cannot be decoded as motion vectors are unavailable due to noise corruption. In one situation, region 3 may only contain one motion vector. In an alternate embodiment, region 3 may contain more that one motion vector. In the first instance, the motion vector is estimated as discussed above. In the case of multiple motion vectors, it is preferred that error concealment, i.e., motion vector estimation, is performed in a zig-zag manner (e.g., one left-most encoded block, followed by one right-most encoded block, then back to the next left-most encoded block, etc.) To estimate the motion vector for the left-most encoded block, the process described with reference to FIG. 4 is used as adjacent blocks are similarly not available due to noise corruption. A similar process is applied to the right-most encoded block to estimate the motion vector. The size and shape of some of the sub-blocks are similarly modified to take into account adjacent blocks that have associated lost/damaged motion vectors.

The invention has been described in conjunction with the preferred embodiment. It is evident that numerous alternatives, modifications, variations, and uses will be apparent to those skilled in the are in light of the forgoing description.

What is claimed is:

1. A method for decoding an encoded portion of an image having an error in a parameter used to decode the portion, said method comprising:

extracting sub-portions of decoded data from portions neighboring to the encoded portion;

generating the parameter for each sub-portion;

using the parameters generated for each sub-portion to estimate a parameter for the encoded portion; and concealing the encoded portion using the estimated parameter.

2. The method as set forth in claim 1, wherein the parameter is a motion vector.

3. The method as set forth in claim 1, wherein the portion is a block.

4. The method as set forth in claim 1, wherein the portion is a macro-block.

5. The method as set forth in claim 1, wherein each sub-portion overlaps an adjacent portion.

6. The method as set forth in claim 1, wherein each sub-portion is adjacent to two sides of the encoded block.

7. The method as set forth in claim 1, wherein if a region of a sub-portion is undecoded, said method further comprising reducing the sub-portion by the region.

8. The method as set forth in claim 1, wherein the estimated parameter is generated by averaging the parameters for each sub-portion.

9. The method as set forth in claim 1, wherein the estimated parameter is generated by averaging the parameters for each sub-portion weighted by an associated parameter estimation error.

10. A device for estimating a parameter of a portion of an encoded image comprising:

a memory configured to store decoded portions of the encoded image; and parameter estimation logic comprising;

sub-portion logic configured to identify sub-portions neighboring the portion of the encoded image and generate a parameter for each sub-portion, and combination logic configured to estimate the parameter of the portion of the encoded image using the combined generated parameters of the sub-portions.

11. The device as set forth in claim 10, wherein the parameter is a motion vector.

12. The device as set forth in claim 10, wherein the portion is a block.

13. The device as set forth in claim 10, wherein the portion is a macro-block.

14. The device as set forth in claim 10, wherein each sub-portion overlaps an adjacent portion.

15. The device as set forth in claim 10, wherein each sub-portion is adjacent to two sides of the encoded block.

16. The device as set forth in claim 10, wherein if a region of a sub-portion is undecoded, said sub-portion logic further configured to reduce the sub-portion by the region.

17. The device as set forth in claim 10, wherein the estimated parameter is generated by averaging the parameters for each sub-portion.

18. The device as set forth in claim 10, wherein the estimated parameter is generated by averaging the parameters for each sub-portion weighted by an associated parameter estimation error.

19. A computer readable medium comprising instructions, which when executed by a processor, decode an encoded portion of an image having an error in an associated block parameter, comprising:

extracting sub-portions of decoded data from portions neighboring to the encoded portion;

generating a parameter for each sub-portion;

using the parameters generated for each sub-portion to estimate a parameter for the encoded portion; and concealing the encoded portion using the estimated parameter.

20. The computer readable medium as set forth in claim 19, wherein the parameter is a motion vector.

21. The computer readable medium as set forth in claim 19, wherein each sub-portion overlaps an adjacent portion.

22. The computer readable medium as set forth in claim 19, wherein each sub-portion is adjacent to two sides of the encoded block.

23. The computer readable medium as set forth in claim 19, wherein if a region of a sub-portion is undecoded, said medium further comprising instructions which when executed by a processor reduce the sub-portion by the region.

24. The computer readable medium as set forth in claim 19, wherein the estimated parameter is generated by averaging the parameters for each sub-portion.

25. The computer readable medium as set forth in claim 19, wherein the estimated parameter is generated by averaging the parameters for each sub-portion weighted by an associated parameter estimation error.

* * * * *